Aug. 3, 1926.
J. BLASCHKE
STEERING MECHANISM
Filed June 17, 1926
1,594,767
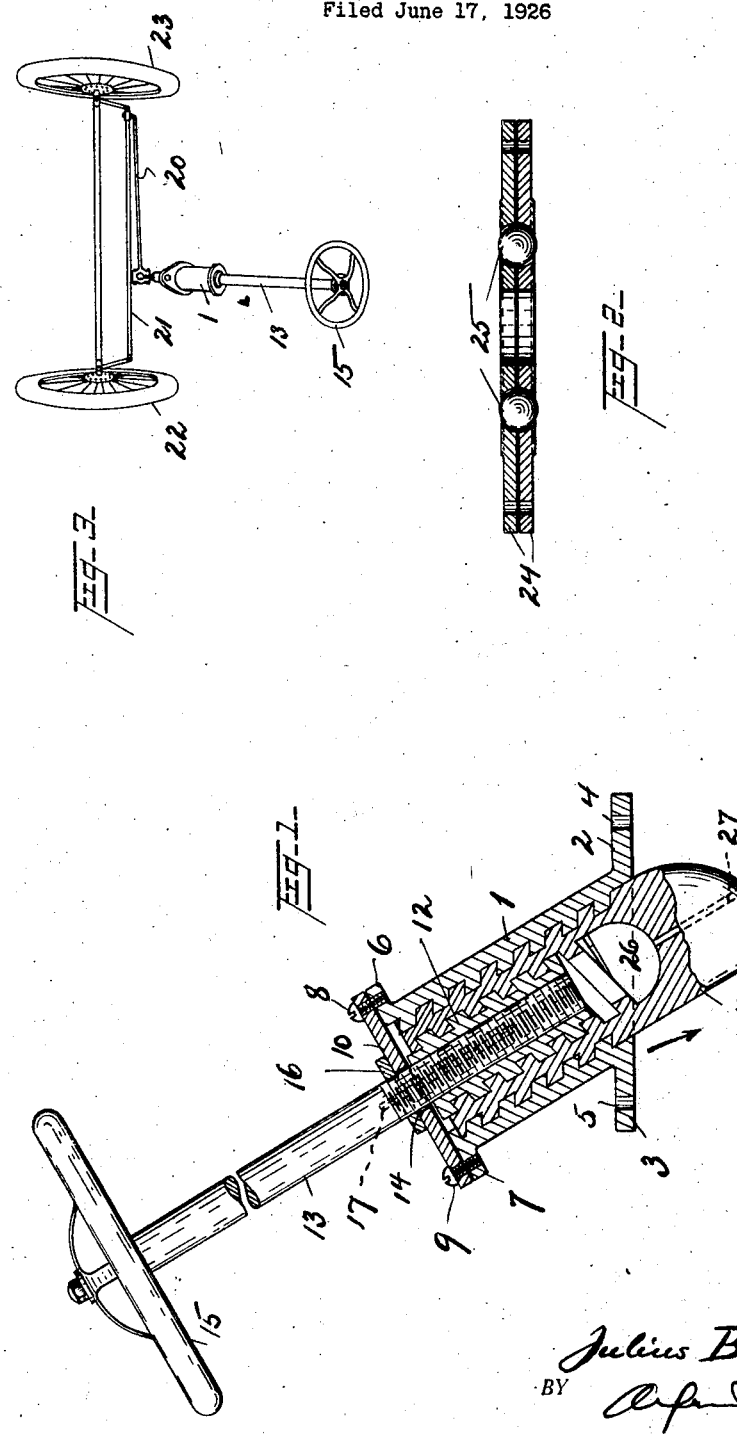
INVENTOR.
Julius Blaschke
BY
ATTORNEY.

Patented Aug. 3, 1926.

1,594,767

UNITED STATES PATENT OFFICE.

JULIUS BLASCHKE, OF BROOKLYN, NEW YORK.

STEERING MECHANISM.

Application filed June 17, 1926. Serial No. 116,515.

My invention relates to steering mechanisms for motor cars and the like, and more especially that type of steering mechanism in which the steering movement is transmitted to the steering wheels by a transversely acting drag rod. The object of the present invention is to simplify the construction of such steering mechanism and thereby also its operation.

For the purpose of illustration, I have shown an embodiment of my invention on the appended drawing, in which Fig. 1 is a sectional view showing the construction of my new steering mechanism, Fig. 2 a sectional view of a modified detail element, and Fig. 3 a somewhat diagrammatic view showing the steering mechanism in connection with the front steering wheels of a motor car.

The steering mechanism as shown comprises a casing 1 provided with flanges 2, 3 having apertures 4, 5, through which may pass screws or bolts for fastening said casing to the footboard of a motor car. At its other end the casing is provided with flanges 6, 7 having threaded apertures for receiving screws 8, 9 whereby the cover-plate 10 is secured to the casing.

As seen in the drawing, casing 1 has inside threads adapted to be engaged by the corresponding outer threads of the steering member 11, the upper threaded portion of which is hollow and is also provided with inner threads as clearly shown. These inner threads have a different direction from the outer threads and are of smaller pitch than said outer threads. The inner threads of the steering member 11 are engaged by the corresponding outer threads of a threaded sleeve 12 which in the embodiment as shown is fastened to the lower end of the steering post 13, being screwed thereon, but it may also be otherwise fastened thereto. The steering post extends through a central opening 14 in the cover-plate 10 of the casing and at its upper end carries the steering wheel 15. Onto the threaded portion of the steering post is screwed a nut 16 bearing on the cover plate, and a key 17 is provided extending through a recess (not shown) in said nut for holding the steering post 13 and the threaded sleeve 12 against relative rotation. In case of any wear of the threaded portion of the steering post 13, all that is necessary is to withdraw the key, loosen the nut, and then screw the post a little further into the threaded sleeve 12.

From the drawing and the foregoing description, it will be seen that upon the steering post 13 being turned by means of the steering wheel 15 in clockwise direction, the steering member 11 will thereby be moved in the direction of the arrow shown in Fig. 1, and vice versa upon the steering post being turned in the opposite direction, and these movements of the steering member 11 are transmitted by the ball 18 provided on its lower lever-like projection 19 to the drag rod 20 shown in Fig. 3 which in turn acts on the tie rod 21 operating the steering wheels 22, 23.

As has been stated above, the inner threads of the steering member 11 are of smaller pitch than its outer threads. Supposing the ratio to be 1:4, then it will require four turns of the steering post 13 to cause one turn of the steering member 11. Of course, any desired ratio may be selected.

It will be clear from the drawing that, after the steering member, by a corresponding turn of the steering post 13, has been moved in the direction of the arrow shown in Fig. 1, the steering member can not move in the opposite direction, if any attempt were made to turn the steering member from its lower end, because such a turning movement would be resisted by the oppositely threaded sleeve 12 which is held against longitudinal movement.

Instead of the simple cover plate 10 shown in Fig. 1, a divided cover plate 24, such as shown in Fig. 2, may be used, which cover plate is equipped with a series of anti-friction balls 25 against which balls bears, on the one side thereof, the nut 16 and, on the other side, the end of the threaded sleeve 12.

The lubricating agent, such as grease or heavy oil, will collect in the bottom space 26 provided in the steering member 11 near its lower end and finds an escape through the bore 27 provided therefor.

It will be obvious that modifications may be introduced differing from the construction as shown and described, and my invention, therefore, is not limited to this construction.

I claim:

1. In a steering mechanism for automobiles, and the like, in combination a fixed casing provided with inside threads, a cover plate for said casing, a hollow steering member provided with inner and outer threads, the latter engaging the inside threads of said casing, a steering post extending through said cover-plate and equipped with a threaded portion in engagement with the inner threads of said hollow steering member, and means for rotating said steering post thereby causing a longitudinal movement of said steering member.

2. In a steering mechanism for automobiles and the like, in combination a fixed casing provided with inside threads, a cover-plate for said casing, a hollow steering member having inner and outer threads, the latter engaging the inside threads of said casing, a steering post extending through said cover-plate, a threaded sleeve secured to the inner end of said steering post, a bearing plate for said steering post, and a means for rotating said steering post thereby causing a longitudinal movement of said steering member.

3. In a steering mechanism for automobiles, and the like, in combination a fixed casing provided with inside threads, a cover-plate for said casing, a hollow steering member provided with inner and outer threads, the latter engaging the inside threads of said casing, a steering post extending through said cover-plate and equipped with a threaded portion in engagement with the inner threads of said hollow steering member, and means for rotating said steering post thereby causing a longitudinal movement of said steering member, the outer threads of said steering member being of a greater pitch than its inner threads.

4. In a steering mechanism for automobiles, and the like, in combination a fixed casing having inside threads, a cover-plate for said casing, a hollow steering member having inner and outer threads of different pitch, the outer threads engaging the inside threads of said casing, a steering post extending through said cover-plate, a threaded sleeve, a means for detachably securing said sleeve to the inner end of said steering post, a bearing plate for said steering post, and a means for rotating the same, thereby causing the longitudinal movement of said steering member in either direction and at a slower speed than the rotation of said steering post.

5. In a steering mechanism for automobiles, and the like, in combination a fixed casing having inside threads, a divided cover plate for said casing, anti-friction balls carried by said plate, a hollow steering member having inner and outer threads, the latter engaging the threads of said casing, a steering post extending through an aperture in said divided cover-plate, a threaded sleeve adjustably secured to the inner end of said steering post and engaging the inner threads of said steering member, a bearing plate for said steering post bearing against said anti-friction balls, and a means for rotating said steering post thereby causing a gradual longitudinal displacement of said steering member.

6. In a steering mechanism for automobiles, and the like, in combination a fixed casing provided with inside threads, a cover-plate for said casing, a hollow steering member having inner and outer threads, the latter engaging the inside threads of said casing, a steering post extending through said cover-plate, a threaded sleeve secured to the inner end of said steering post, a bearing plate for said steering post, a means for rotating said steering post thereby causing a longitudinal movement of said steering member and a bore in said steering member permitting the escape of lubricant waste.

7. In a steering mechanism for automobiles, and the like, in combination a fixed casing having inside threads, a divided cover plate for said casing, anti-friction balls carried by said plate, a hollow steering member having inner and outer threads, the latter engaging the threads of said casing, a steering post extending through an aperture in said divided cover-plate, a threaded sleeve adjustably secured to the inner end of said steering post, and engaging the inner threads of said steering member, a bearing plate for said steering post bearing against said anti-friction balls, and a means for rotating said steering post thereby causing a gradual longitudinal displacement of said steering member, the ratio between the rotation of said steering post and said steering member being about 4:1.

In testimony whereof I affix my signature.

JULIUS BLASCHKE.